March 11, 1941.  A. A. CARREL ET AL  2,234,515
CRADLE FOR INFANTS
Filed Oct. 14, 1938
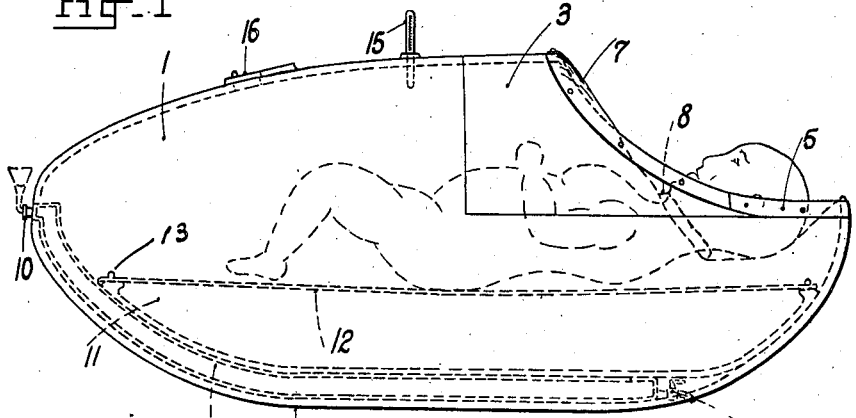
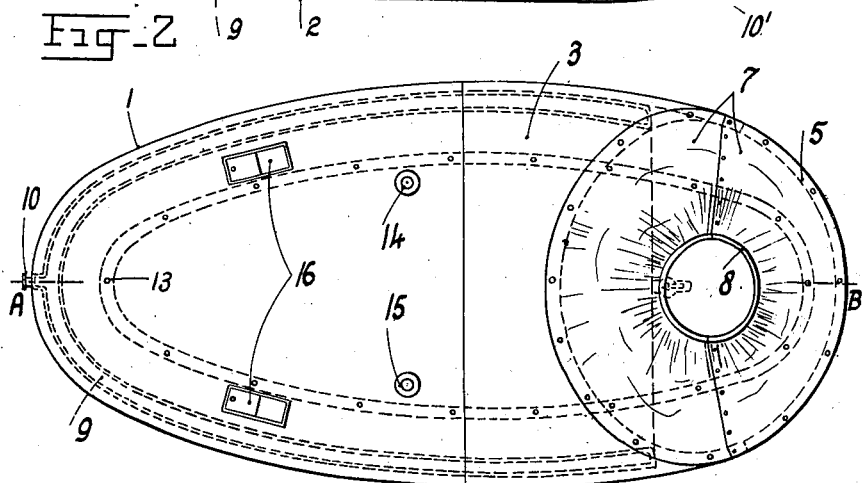
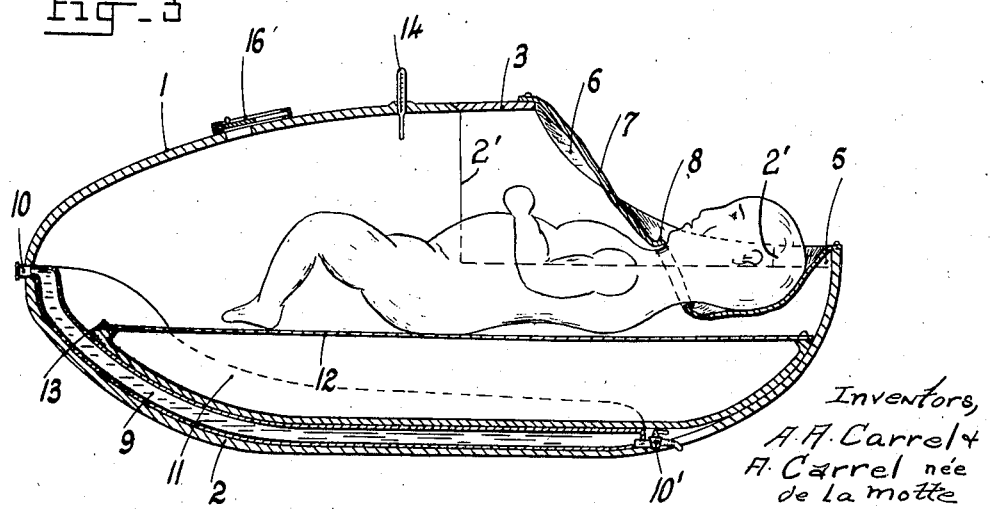
Inventors,
A. A. Carrel &
A. Carrel née
de La Motte
By: Glascock Downing & Seebold
Attys.

Patented Mar. 11, 1941

2,234,515

UNITED STATES PATENT OFFICE 2,234,515

CRADLE FOR INFANTS

Alexis Auguste Carrel and Anne Carrel, née de la Motte, Paris, France

Application October 14, 1938, Serial No. 235,076
In France November 9, 1937

5 Claims. (Cl. 5—97)

This invention refers to a "self-heater" cradle for bringing up nursing infants and which permits of obtaining a better bodily development by dispensing with all clothing, keeping the skin of the body and the members at the most favourable temperature regulated according to the age of the infant, and avoiding the work ordinarily caused to the mother by the necessity for dressing and undressing and also the washing of the soiled linen.

The cradle moreover permits the evacuation of the urine and of the faeces.

In order that the invention may be well understood, one embodiment will be more particularly described with reference to the accompanying drawing in which:

Figure 1 is an elevation of the cradle;

Figure 2 is a plan, and

Figure 3 is a longitudinal section on the line A—B of Figure 2.

The cradle is essentially constituted by a hollow body 1 of substantial oval shape in plan and in elevation and made of insulating material such as wood fibre, the thickness of the wall of which is about two centimeters. The bottom 2 of the body is flat over a large portion of its surface, in order to ensure stability.

The rear extremity of the upper part of the hollow body is provided with a large opening 2' to permit of the introduction of the different necessary accessories and of the infant, this opening being partly closed by a removable rigid cover 3 which in conjunction with the rear fixed part 5 of the body is also provided with a circular opening 6 on the edge of which is fixed the periphery of a flexible cover 7 of soft and thick wool covered with a thin and impermeable material. This flexible cover is itself in two sections connected by press buttons or the like fixed respectively on the removable cover 3 and on the fixed part 5. The sections of flexible cover has an opening 8 in the centre, the diameter of which is such as to fit the neck of an infant placed inside the cradle.

On the bottom of the cradle rests a vessel 9 in the form of a double-walled dish or scoop member made of aluminium or the like, the front part of which conforms to the shape of the oval body 1 up to the front end thereof. An orifice closed by a plug 10 permits the vessel to be filled by means of a funnel. At the rear end of the vessel there is an emptying tap 10¹.

On the vessel 9 there rests a receptacle 11 in the form of a dish of suitable depth covered by a hammock of coarse cloth 12 fixed around its edges by buttons and eyelets 13. At the upper part of the cradle are inserted dry and wet thermometers 14 and 15 respectively and there are also provided ventilation apertures 16.

To place the receptacle 11 covered with its hammock 12 in position, it is necessary to separate the two sections of the flexible cover 7 into its two parts in order to disengage toward the front the removable rigid cover 3. The flexible section of the cover 7 connected to the body 1 incidentally serves as a pillow. The receptacle and the hammock having been placed in position on the vessel 9', there is introduced into the latter a sufficient quantity of hot water to raise the temperature of the cradle, and which according to the age of the infant should vary between 28° and 37° C. approximately.

Then, when the desired temperature is attained the infant is placed naked in the apparatus and is laid on the hammock 12. The removable rigid cover is now placed in position on the body and the two parts of the flexible cover 7 are then fastened about its neck. There is thus obtained a space in the interior of which there is a suitable temperature determined by the age of the infant. At the earliest age the temperature should be raised by the introduction from time to time of hot water into the vessel 9. When the infant is older, the heat which he emits is amply sufficient to maintain the temperature of the cradle at a suitable degree, which justifies the name "self-heater" cradle.

In hot countries, on the contrary, cold water will be introduced into the vessel 9. By comparing the dry thermometer 14 and the wet thermometer 15, it is possible to find the humidity of the atmosphere of the cradle.

According to the age of the infant and its condition, the temperature and the humidity are regulated by the introduction of water into the vessel and by opening the ventilation apertures 16.

When being suckled, the infant is taken from the cradle and placed in a woolen sack.

When the hammock 12 of the receptacle 11 is soiled, it is taken out of the cradle and replaced by a clean one. The washing and drying of the thin material of the hammock are simple and easy operations.

The cradle may be supplemented by a small carriage into which it fits and which thus permits the infant to be taken out walking without the necessity of lifting it from its surroundings which are at a suitable temperature.

We claim:

1. A cradle for infants comprising a hollow body of insulating material adapted to receive an infant, said body having a flat base, a temperature regulating container in the lower portion of the body, a hammock supported within the body for supporting the infant, a removable cover for the body, the cover and the adjacent end portion of the body having an opening therein, and a two-part flexible closure for the opening one part of which is connected with the body and serves as a pillow while the other portion is connected to the removable cover and removably connected to the first mentioned part of the flexible closure and arranged to embrace the neck of the infant.

2. A cradle for infants as claimed in claim 1, in which the body is substantially oval shaped in plan and elevation.

3. A cradle for infants as claimed in claim 1, in which the temperature regulating means includes a water container in the lower portion of the body provided with inlets and outlets extending through the body, and a removable container in said body on said water container and acting to support the hammock.

4. A cradle for infants comprising a hollow body substantially oval shaped in plan and elevation and formed of insulating material and provided with a flat base, a water container in the lower portion of the body, an inlet funnel and a discharge valve for said container, a removable container in said body above the first mentioned container, a hammock detachably engaged with and suspended over said removable container and adapted to support an infant in the body, a removable rigid cover for the body near the head end thereof, the cover and adjacent end portion of the body having an opening therein, flexible means on said rigid cover and on the body for closing said opening, said flexible means being detachable and acting as a combined pillow for supporting the head of the infant and also encircling the neck of the infant and forming a substantially airtight seal therewith.

5. A cradle as claimed in claim 4, wherein said flexible means includes two sections composed of thick soft wool material covered with a thin and impermeable material, and the sections of said material being detachably connected together and respectively to the body and the removable rigid cover.

ALEXIS AUGUSTE CARREL.
ANNE CARREL, NÉE DE LA MOTTE.